(12) United States Patent
Wang et al.

(10) Patent No.: US 10,445,402 B1
(45) Date of Patent: Oct. 15, 2019

(54) FAST AND ENERGY-EFFICIENT REGION OF INTEREST POOLING FOR OBJECT DETECTION WITH CONVOLUTIONAL NEURAL NETWORK

(71) Applicant: Ambarella, Inc., Santa Clara, CA (US)

(72) Inventors: Yu Wang, San Jose, CA (US); Wei Fang, Sunnyvale, CA (US); Leslie D. Kohn, Saratoga, CA (US)

(73) Assignee: Ambarella, Inc., Santa Clara, CA (US)

(*) Notice: Subject to any disclaimer, the term of this patent is extended or adjusted under 35 U.S.C. 154(b) by 236 days.

(21) Appl. No.: 15/720,205

(22) Filed: Sep. 29, 2017

(51) Int. Cl.
*G06F 17/15* (2006.01)
*G06N 3/02* (2006.01)
*G06K 9/32* (2006.01)

(52) U.S. Cl.
CPC .......... *G06F 17/15* (2013.01); *G06K 9/3233* (2013.01); *G06N 3/02* (2013.01)

(58) Field of Classification Search
CPC ......... G06F 17/15; G06K 9/3233; G06N 3/02
USPC ....................................................... 382/279
See application file for complete search history.

(56) References Cited

U.S. PATENT DOCUMENTS

2009/0112287 A1* 4/2009 Greenberg ......... A61N 1/36046
607/54

OTHER PUBLICATIONS

Ren, Shaoqing, et al., "Faster R-CNN: Towards Real-Time Object Detection With Region Proposal Networks", arXiv preprint arXiv:1506.01497v3 [cs.CV], Jan. 6, 2016, 14 pages.
Girshick, Ross, "Fast R-CNN", arXiv: 150408083v2 [cs.CV], Sep. 27, 2015, 9 pages.
Dai, Jifeng et al., "Instance-Aware Semantic Segmentation Via Multi-Task Network Cascades", 2016, pp. 3150-3158.

* cited by examiner

*Primary Examiner* — Amandeep Saini
(74) *Attorney, Agent, or Firm* — Christopher P. Maiorana, PC (57) ABSTRACT

An apparatus comprises a memory, one or more hardware engines, and a processor. The memory may be configured to store a feature map pyramid comprising an original feature map and a plurality of scaled feature maps. The one or more hardware engines may be configured to perform pooling operations utilizing power of two down sampling. The processor may be configured to generate the feature map pyramid from the original feature map using said one or more hardware engines.

20 Claims, 7 Drawing Sheets

FAST AND ENERGY-EFFICIENT REGION OF INTEREST POOLING FOR OBJECT DETECTION WITH CONVOLUTIONAL NEURAL NETWORK

FIELD OF THE INVENTION

The invention relates to computer vision generally and, more particularly, to a method and/or apparatus for implementing a fast and energy-efficient region of interest pooling for object detection with a convolutional neural network.

BACKGROUND

Region of interest (ROI) pooling is a key operation widely used by modern Convolutional Neural Network (CNN) based object detectors. Most state-of-the-art object detectors based on CNN employ a two stage detection framework in which the first stage produces a set of rectangular object proposals, each with an objectness score. These proposals are represented in bounding boxes of different aspect ratios and sizes. The proposals are class-agnostic and coarse and, therefore, need subsequent per-proposal classification and refinement in the second stage. Region of Interest (ROI) pooling is used to transform feature representations of these proposals to obtain fixed-size feature maps (e.g. 7×7 in spatial extent).

An input image is forwarded through several convolution layers (e.g., a CNN) to generate a convolutional feature map of size C×H×W, where C, H and W denote the depth (i.e. number of channels), height and width of the feature map. Given this feature map as input, a region proposal generator, which could be an external proposal method or internal sub-network, outputs a set of proposals of objects within the image. The proposals are of non-uniform sizes and are projected onto the feature map to produce a fixed-size feature map for each region proposal via the ROI pooling operation. Conventional ROI pooling operations are both computationally and memory intensive, making the conventional ROI pooling operations difficult to deploy on an embedded device having limited hardware resources and power budgets.

It would be desirable to implement a new region of interest pooling method for fast and energy-efficient object detection with convolutional neural network.

SUMMARY

The invention concerns an apparatus comprises a memory, one or more hardware engines, and a processor. The memory may be configured to store a feature map pyramid comprising an original feature map and a plurality of scaled feature maps. The one or more hardware engines may be configured to perform pooling operations utilizing power of two down sampling. The processor may be configured to generate the feature map pyramid from the original feature map using said one or more hardware engines.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing fast and energy-efficient region of interest pooling for object detection with a convolutional neural network that may (i) minimize an amount of resampling computation, (ii) reduce energy consumption, (iii) construct a feature map pyramid from a convolutional feature map, (iv) assign proposals/ROIs to feature maps in a feature map pyramid, (v) be implemented on embedded devices having limited hardware resources and power budgets, (vi) be implemented with a vector processor, CPU, DSP, or GPU, and/or (vii) be implemented as one or more integrated circuits.

In various embodiments, a very efficient region of interest (ROI) pooling method is provided that achieves significant speed-ups over existing methods while maintaining comparable object detection performance. The ROI pooling method in accordance with embodiments of the invention may be used in both training and deployment phases of an object detector and supports any modern two-stage object detection networks. The ROI pooling method in accordance with embodiments of the invention is embedded device friendly and applicable to any modern two-stage object detection networks. The ROI pooling method in accordance with embodiments of the invention makes it possible to run modern CNN-based object detectors in real-time on resource-limited hardware for time-critical applications such as a self-driving vehicle. The new pooling scheme based on a feature map pyramid and ROI resampling, which may be built on top of a generic hardware engine configured, inter alia, to perform pooling and bilinear interpolation, make ROI pooling operations efficient in hardware.

Figure 1:
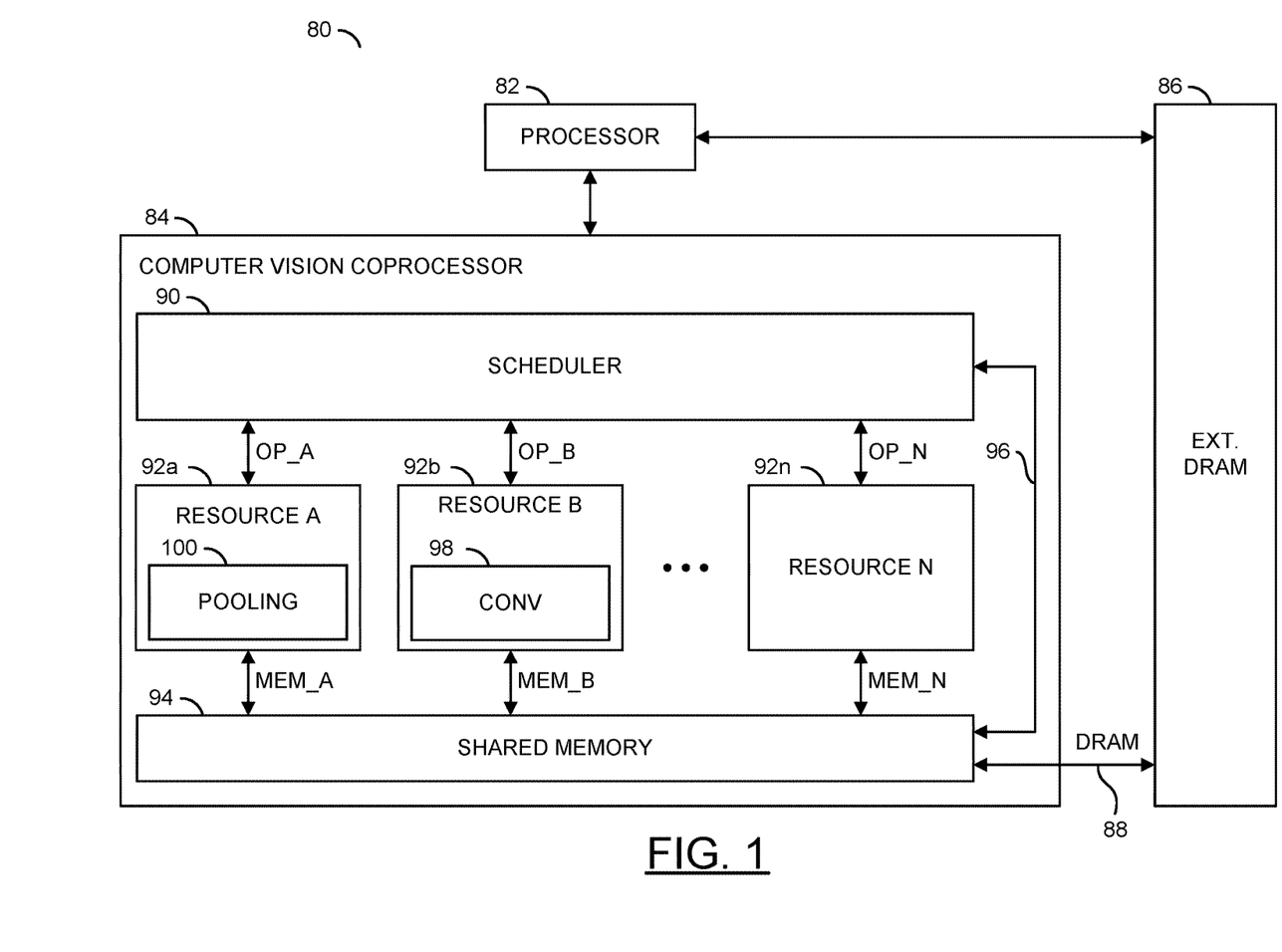
FIG. 1 is a diagram illustrating a context in which a matching with approximate cross-check operation in accordance with an example embodiment of the invention may be implemented.

Referring to FIG. 1, a diagram of a system 80 is shown illustrating a context in which a detection process incorporating a region of interest (ROI) pooling approach in accordance with an example embodiment of the invention may be implemented. The system (or apparatus) 80 may be implemented as part of a computer vision system. In various embodiments, the system 80 may be implemented as part of a camera, a computer, a server (e.g., a cloud server), a smart phone (e.g., a cellular telephone), a personal digital assistant, or the like. The system 80 may be configured for applications including, but not limited to autonomous and semi-autonomous vehicles (e.g., cars, trucks, agricultural machinery, drones, etc.), manufacturing, and security/surveillance systems. In contrast to a general purpose computer, the system 80 generally comprises hardware circuitry that is optimized to provide a high performance image processing and computer vision pipeline in minimal area and with minimal power consumption.

In an example embodiment, the system 80 generally comprises a block (or circuit) 82, a block (or circuit) 84, a block (or circuit) 86 and a memory bus 88. The circuit 84 generally comprises a block (or circuit) 90, one or more blocks (or circuits) 92a-92n, a block (or circuit) 94 and a path 96. In an example embodiment, one or more of the circuits 92a-92n may comprise a block (or circuit) 98 and a block (or circuit) 100. In an example, the circuit 98 may be configured to provide convolution calculations in multiple dimensions. An example implementation of a convolution calculation scheme that may be used to implement the circuit 98 may be found in co-pending U.S. application Ser. No. 15/403,540, filed Jan. 11, 2017, which is herein incorporated by reference in its entirety. The circuit 100 may be configured to provide ROI pooling operations in accordance with an example embodiment of the invention (e.g., as part of an object detection process).

Multiple signals (e.g., OP_A to OP_N) may be exchanged between the circuit 90 and the respective circuits 92a-92n. Each signal OP_A to OP_N may convey execution operation information and/or yield operation information. Multiple signals (e.g., MEM_A to MEM_N) may be exchanged between the respective circuits 92a-92n and the circuit 94. The signals MEM_A to MEM_N may carry data. A signal (e.g., DRAM) may be exchanged between the circuit 86 and the circuit 94. The signal DRAM may transfer data between the circuits 86 and 94.

The circuit 82 may implement a processor circuit. In some embodiments, the processor circuit 82 may be a general purpose processor circuit. The processor circuit 82 may be operational to interact with the circuit 84 and the circuit 86 to perform various processing tasks.

The circuit 84 may implement a coprocessor circuit. The coprocessor circuit 84 is generally operational to perform specific processing tasks as arranged by the processor circuit 82. In various embodiments, the coprocessor 84 may be implemented solely in hardware. The coprocessor 84 may directly execute a data flow directed to object detection with region of interest pooling, and generated by software that specifies processing (e.g., computer vision) tasks.

In various embodiments, the circuit 86 may implement a dynamic random access memory (DRAM) circuit. The DRAM circuit 86 is generally operational to store multidimensional arrays of input data elements and various forms of output data elements. The DRAM circuit 86 may exchange the input data elements and the output data elements with the processor circuit 82 and the coprocessor circuit 84.

The circuit 90 may implement a scheduler circuit. The scheduler circuit 90 is generally operational to schedule tasks among the circuits 92a-92n to perform a variety of computer vision related tasks as defined by the processor circuit 82. Individual tasks may be allocated by the scheduler circuit 90 to the circuits 92a-92n. The scheduler circuit 90 may time multiplex the tasks to the circuits 92a-92n based on the availability of the circuits 92a-92n to perform the work.

Each circuit 92a-92n may implement a processing resource (or hardware engine). The hardware engines 92a-92n are generally operational to perform specific processing tasks. The hardware engines 92a-92n may be implemented to include dedicated hardware circuits that are optimized for high-performance and low power consumption while performing the specific processing tasks. In some configurations, the hardware engines 92a-92n may operate in parallel and independent of each other. In other configurations, the hardware engines 92a-92n may operate collectively among each other to perform allocated tasks.

The hardware engines 92a-92n may be homogenous processing resources (e.g., all circuits 92a-92n may have the same capabilities) or heterogeneous processing resources (e.g., two or more circuits 92a-92n may have different capabilities). The hardware engines 92a-92n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator. In various embodiments, the hardware engines 92a-92n may be implemented solely as hardware circuits. In some embodiments, the hardware engines 92a-92n may be implemented as generic engines that may be configured through circuit customization and/or software/firmware to operate as special purpose machines (or engines). In some embodiments, the hardware engines 92a-92n may instead be implemented as one or more instances or threads of program code executed on the processor 82 and/or one or more processors, including, but not limited to, a vector processor, a central processing unit (CPU), a digital signal processor (DSP), or a graphics processing unit (GPU).

The circuit 94 may implement a shared memory circuit. The shared memory 94 is generally operational to store all of or portions of the multidimensional arrays (or vectors) of input data elements and output data elements generated and/or utilized by the hardware engines 92a-92n. The input data elements may be transferred to the shared memory 94 from the DRAM circuit 86 via the memory bus 88. The output data elements may be sent from the shared memory 94 to the DRAM circuit 86 via the memory bus 88.

The path 96 may implement a transfer path internal to the coprocessor 84. The transfer path 96 is generally operational to move data from the scheduler circuit 90 to the shared memory 94. The transfer path 96 may also be operational to move data from the shared memory 94 to the scheduler circuit 90.

The circuit 98 may implement a convolution circuit. The convolution circuit 98 may be in communication with the memory circuit 94 to receive input data and present the output data. The convolution circuit 98 is generally operational to fetch a plurality of data vectors from the memory circuit 94. Each data vector may comprise a plurality of the data values. The convolution circuit 98 may also be operational to fetch a kernel from the memory circuit 94. The kernel generally comprises a plurality of kernel values. The convolution circuit 98 may also be operational to fetch a block from the memory circuit 94 to an internal (or local) buffer. The block generally comprises a plurality of input tiles. Each input tile may comprise a plurality of input values in multiple dimensions. The convolution circuit 98 may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 98 may be implemented solely in hardware. An example of a convolution calculation scheme that may be used to implement the circuit 98 may be found in co-pending U.S. application Ser. No. 14/403,540, filed Jan. 11, 2017, which is herein incorporated by reference in its entirety.

The circuit 100 may implement a pooling process in accordance with embodiments of the invention. In various embodiments, a region of interest pooling scheme in accordance with embodiments of the invention may be performed according to implementation descriptions provided herein.

Figure 2:
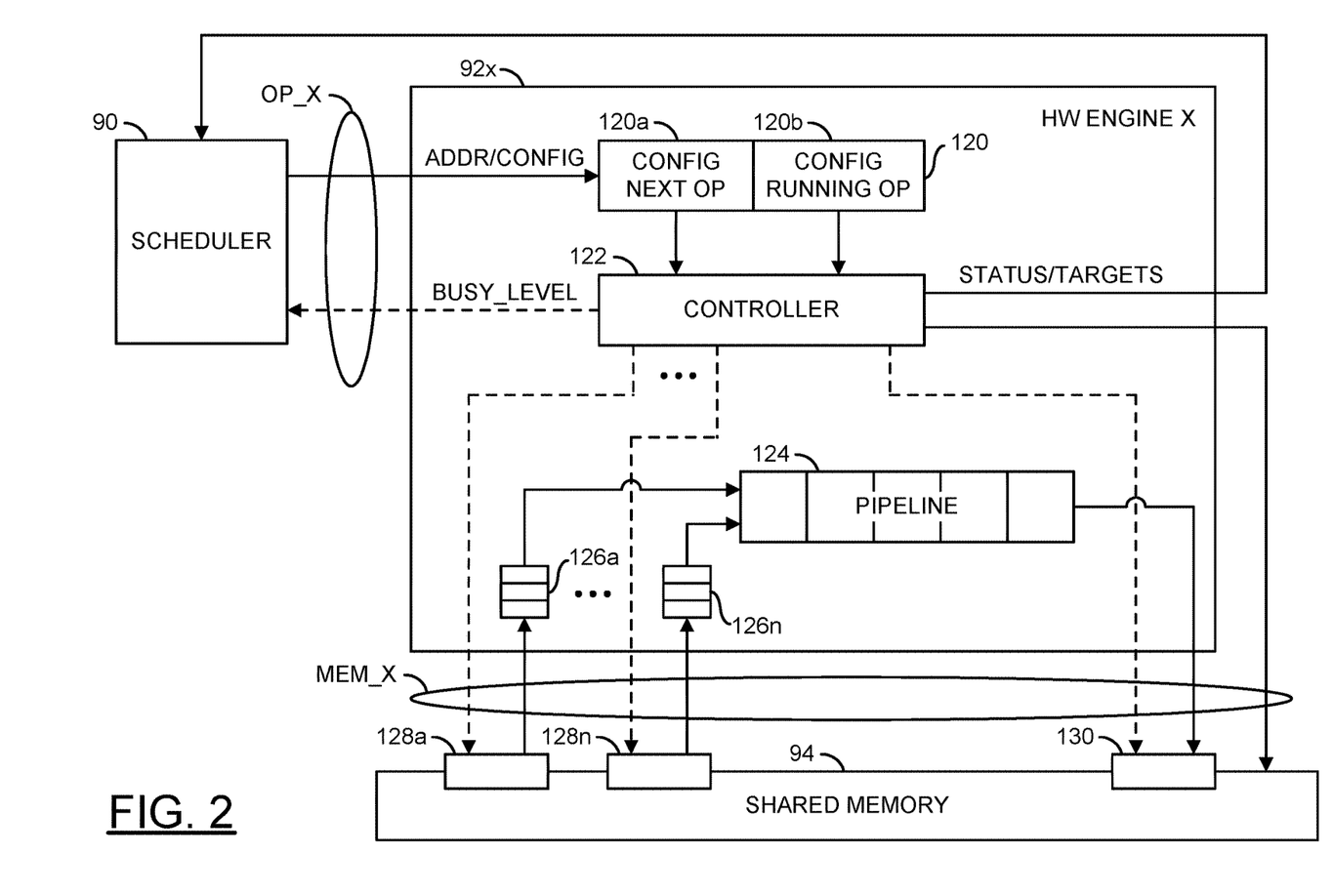
FIG. 2 is a diagram illustrating a generic implementation of a hardware engine of FIG. 1.

Referring to FIG. 2, a diagram illustrating an example implementation of a generic hardware engine 92x of FIG. 1 is shown. The hardware engine 92x may be representative of the hardware engines 92a-92n. The hardware engine 92x generally comprises a block (or circuit) 120, a block (or circuit) 122, a block (or circuit) 124, and a number of blocks (or circuits) 126a-126n. The circuit 120 may be implemented as a pair of memories (or buffers) 120a and 120b. The circuit 122 may implement a controller circuit. In an example, the circuit 122 may include one or more finite state machines (FSMs) configured to control various operators implemented by the hardware engine 92x. The circuit 124 may implement a processing pipeline of the hardware engine 92x. The circuits 126a-126n may implement first-in-first-out (FIFO) memories. The circuits 126a-126n may be configured as input buffers for the processing pipeline 124. The shared memory 94 may be configured (e.g., by signals from the circuit 122) as multiple shared input buffers 128a-128n and one or more output buffers 130.

A signal (e.g., ADDR/CONFIG) may be generated by the scheduler circuit 90 and received by the hardware engine 92x. The signal ADDR/CONFIG may carry address information and configuration data. A signal (e.g., BUSY_LEVEL) may be generated by the circuit 122 and transferred to the scheduler circuit 90. The signal BUSY_LEVEL may convey the busy level of the hardware engine 92x. A signal (e.g., STATUS/TARGETS) may be generated by the circuit 122 and transferred to the scheduler circuit 90. The signal STATUS/TARGETS may provide status information regarding the hardware engine 92x and target information for the operands.

In an example embodiment, the buffers 120a and 120b may be configured as a double-banked configuration buffer. The double-banked buffer may be operational to store configuration information for a currently running operation in one buffer (e.g., the buffer 120b) while configuration information for a next operation is being moved into the other buffer (e.g., the buffer 120a). The scheduler 90 generally loads operator configuration information, including status words in a case where the operator has been partially processed in previous operator chunks, into the double-banked buffer. Once the circuit 122 is finished with the configuration information of the running operation and the configuration information for the next operation has been received, the buffers 120a and 120b may swapped.

The circuit 122 generally implements the control circuitry of the hardware engine 92x. The circuit 122 determines when to switch from the currently running operator to the new operator. The controller 122 is generally operational to control the movement of information into, out of, and internal to the hardware engine 122x. In general, the operation of the hardware engine 92x is pipelined. During an operator switch, a front end of the pipeline 124 may already be working on data for the new operator while a tail-end of the pipeline 124 is still finishing up the processing associated with old operator.

The circuit 124 may implement a pipeline circuit. The pipeline circuit 124 is generally operational to process operands received from the shared memory 94 using functionality designed into the hardware engine 92x. The circuit 124 may communicate data resulting from the functions performed to the one or more shared buffers 130.

The buffers 126a-126n may implement FIFO buffers. The FIFO buffers 126a-126n may be operational to store operands received from the shared buffers 128a-128n for processing in the pipeline 124. In general, the number of FIFO buffers and the number of shared buffers implemented may be varied to meet the design criteria of a particular application.

Figure 3:
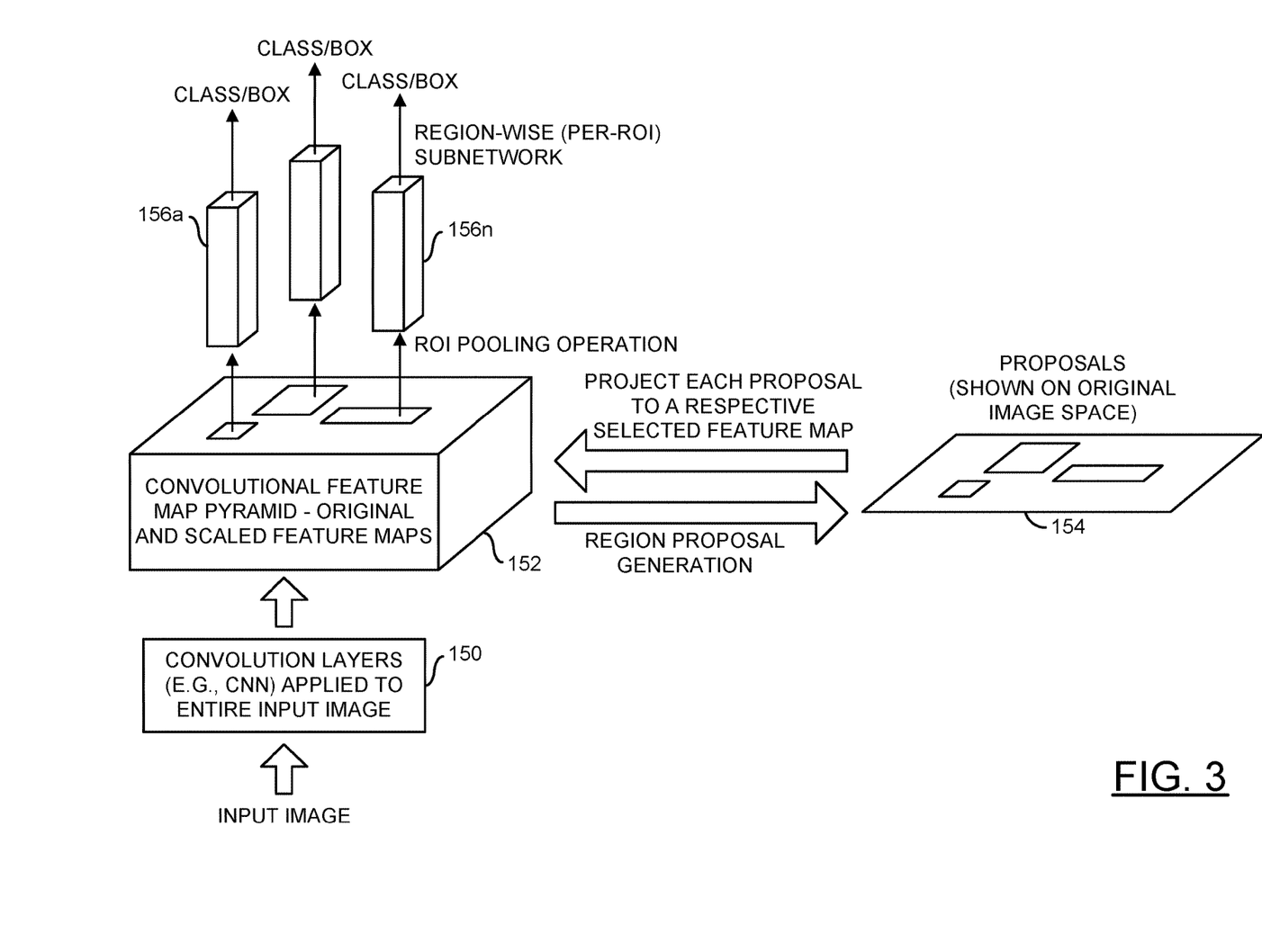
FIG. 3 is a diagram illustrating an example region of interest (ROI) pooling operation in accordance with an example embodiment of the invention with a context of object detection with convolutional neural network (CNN)

Referring to FIG. 3, a diagram is shown illustrating an example region of interest (ROI) pooling operation in accordance with an example embodiment of the invention implemented in a context of object detection with a convolutional neural network (CNN). In various embodiments, a whole input image is generally forwarded through several convolution layers 150 to generate a convolutional feature map pyramid 152. The feature map pyramid 152 generally comprises an original feature map and a plurality of scaled feature maps. The original feature map generally is of size C×H×W, where C, H, and W denote the depth (e.g., number of channels), height, and width of the original feature map. The plurality of scaled feature maps (e.g., 6, 9, etc.) are generated from the original feature map, for example, by power of two down-sampling.

The original feature map may be used as input to a region proposal generator. In various embodiments, the region proposal generator may be an external proposal method or internal sub-network. The region proposal generator may be implemented using conventional and/or proprietary techniques. The region proposal generator is generally configured to output a set of proposals of objects (e.g., regions of interest) within the input image (e.g., illustrated on the original image space 154). The proposals/ROIs may be of non-uniform sizes. In various embodiments, the proposals/ROIs received from the region proposal generator are generally projected onto corresponding feature maps of the feature map pyramid 152 based on predetermined criteria (e.g., minimizing resampling computations, etc.). A ROI pooling operation in accordance with an embodiment of the invention is performed on each proposal/ROI received to produce a fixed-size feature map 156a-156n for each region proposal. Each fixed-size feature map 156a-156n is generally fed to a subsequent per-proposal (per-ROI) sub-network (e.g. a region-based convolutional neural network, or R-CNN) or process for object classification (e.g. car, pedestrian, or cyclist) and bounding box regression/refinement. An example of a region-based convolutional network method may be found in R. Girschick, "Fast R-CNN," in IEEE International Conference on Computer Vision (ICCV), 2015, which is herein incorporated by reference in its entirety. In an example, the result of the region of interest pooling may be used to classify objects in an environment around a vehicle and in providing at least one of a warning to a driver of the vehicle or an adjustment to at least one of a drive train, a steering mechanism, or a braking system of the vehicle.

Figure 4:
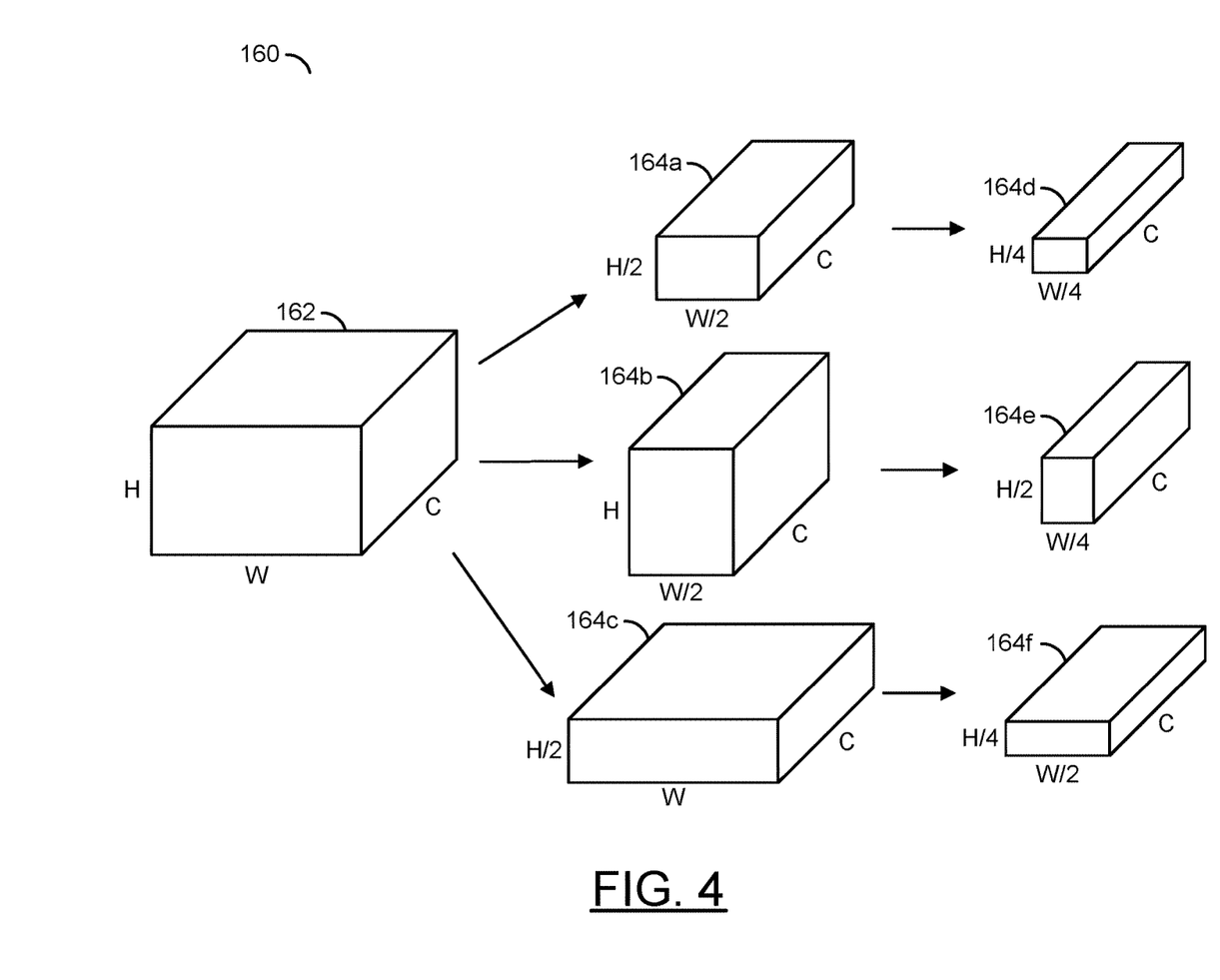
FIG. 4 is a diagram illustrating an example feature map pyramid in accordance with an example embodiment of the invention.

Referring to FIG. 4, a diagram is shown illustrating an example feature map pyramid 160 in accordance with an example embodiment of the invention. In an example, the feature map pyramid 160 may be constructed comprising an original feature map 162 and a plurality of scaled feature maps 164a-164f. The original feature map 162 is generally produced by forwarding an input image through several convolution layers (e.g., a CNN). In an example, the original feature map 162 may be generated comprising a three-dimensional array having dimensions C×H×W, where C, H, and W denote the depth (e.g., number of channels), height and width of the original feature map. In an example, six scaled feature maps 164a-164f may be constructed comprising three-dimensional arrays having dimensions of (i) C×H/2×W, (ii) C×H×W/2, (iii) C×H/2×W/2, (iv) C×H/4×W/2, (v) C×H/2×W/4, and (vi) C×H/4×W/4. However, the number of levels (scales) constructed may be varied (e.g., 6, 9, etc.) to meet the design and/or performance criteria of a particular application.

Figure 5:
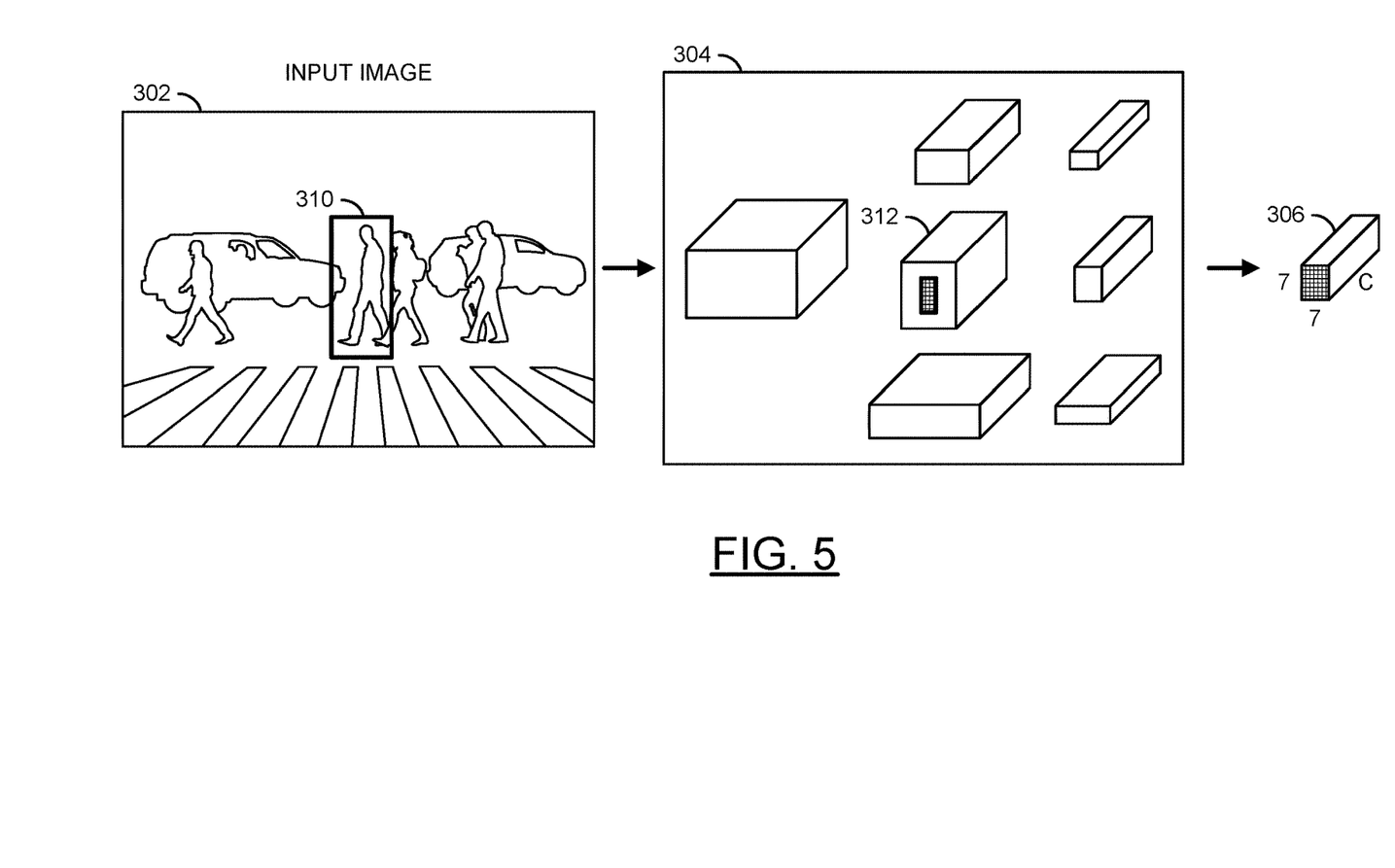
FIG. 5 is a diagram illustrating an example Region of Interest (ROI) pooling operation in accordance with an example embodiment of the invention.

Referring to FIG. 5, a diagram is shown illustrating an example Region of Interest (ROI) pooling operation in accordance with an example embodiment of the invention. In an example, an input image 302 may be forwarded through several convolution layers to generate a convolutional feature map pyramid 304. A Region of Interest (ROI) pooling operation in accordance with an example embodiment of the invention may be applied to a region proposal 310 using the feature map pyramid 304 to produce a fixed-size feature map 306 for the region proposal 310. In a first step, the region proposal 310 may be projected onto a selected corresponding feature map 312 in the feature map pyramid 304. The corresponding feature map 312 may be selected based on predefined criteria/considerations such as minimizing one or more of computational burden, time, and/or energy consumption. The ROI pooling operation may then crop and resample (e.g., warp) the selected corresponding feature map 312 to obtain the fixed-size feature map 306. In an example, max pooling and a warping operation (e.g., bilinear interpolation) may be applied to convert the ROI projected onto the feature map 312 to a fixed spatial extent (e.g., C×7×7) of the fixed-size feature map 306.

Figure 6:
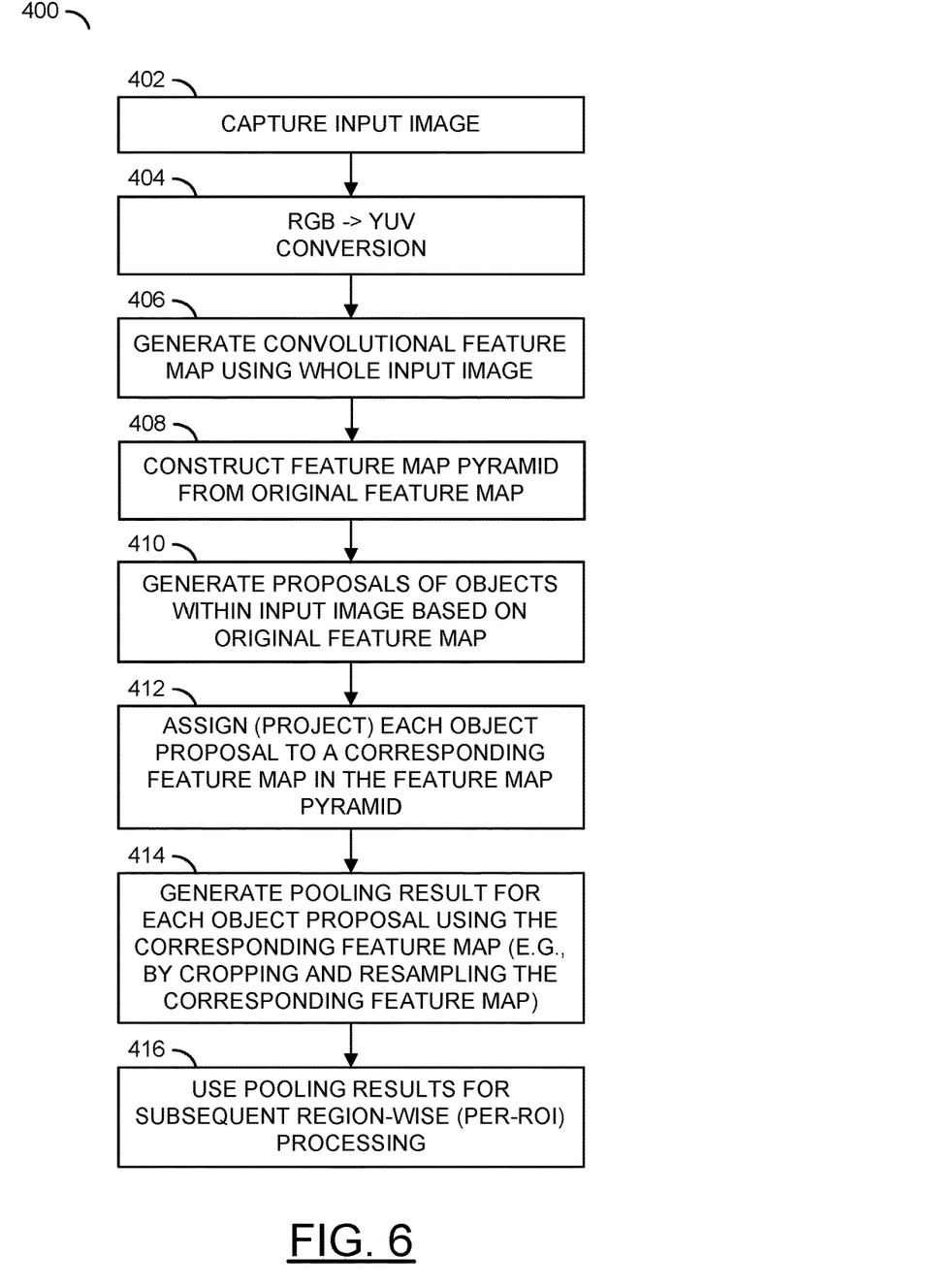
FIG. 6 is a diagram illustrating a process in accordance with an example embodiment of the invention.

Referring to FIG. 6, a flow diagram of a process 400 is shown illustrating an example data flow in accordance with an example embodiment of the invention. The process (or method) 400 generally implements a region of interest (ROI) pooling scheme in accordance with an example embodiment of the invention. In an example embodiment, the process 400 may comprise a step (or state) 402, a step (or state) 404, a step (or state) 406, a step (or state) 408, a step (or state) 410, a step (or state) 412, a step (or state) 414, and a step (or state) 416. In an example embodiment, the steps 402-416 may implement an object detection scheme utilizing an ROI pooling technique in accordance with an example embodiment of the invention.

The process 400 generally begins in the step 402. In the step 402, the process 400 may capture an image (e.g., using a video camera or some other image sensor). From the step 402, the process 400 moves to the step 404. In the step 404, the process 400 may perform a color space conversion (e.g., RGB→YUV). The step 404 may also comprise other types of image processing (e.g., white balance, motion compensation, noise reduction, color correction, etc.). The process 400 then moves to the step 406.

In the step 406, the process 400 may generate a convolutional feature map using the whole input image. In an example, the whole image may be forwarded through several convolution layers to generate a convolutional feature map of size C×H×W, where C, H, and W denote the depth (e.g., number of channels, etc.), height, and width of the feature map. The process 400 then moves to the step 408. In the step 408, the process 400 constructs a feature map pyramid from the original feature map. The feature map pyramid generally provides a scale space to ensure that a down-sampling process (e.g., using bilinear interpolation hardware) down-samples a cropped feature map by no more than 2× in either the width or height dimension.

In an example, the feature map pyramid may be constructed from the original feature map by resizing the original feature map to form a plurality of scaled featured maps in addition to the original feature map. In an example, one or more generic engines may be configured to perform one or more of (i) pooling of $2^n \times 2^n$ window-size with $2^n \times 2^n$ decimation, (ii) pooling of $2^m \times 2^n$ window size with $2^m \times 2^n$ decimation, (iii) pooling of $2^n \times 2^m$ window size with $2^n \times 2^m$ decimation, or (iv) any combination thereof, where n is an integer greater than or equal to 1 and m is an integer ranging from zero to n−1. In an example, the generic engines may be configured to provide one or more of pooling operators including, but not limited to max pooling, average pooling, stochastic pooling, weighted average pooling, and pooling with downsampling.

In an example, a feature map pyramid may be constructed comprising the original feature map and six scaled feature maps. The original feature map may be generated comprising a three-dimensional array having dimensions C×H×W. The six scaled feature maps may be constructed comprising three-dimensional arrays having dimensions of (i) C×H/2×W, (ii) C×H×W/2, (iii) C×H/2×W/2, (iv) C×H/4×W/2, (v) C×H/2×W/4, and (vi) C×H/4×W/4. However, the number of levels (scales) constructed may be varied (e.g., 6, 9, etc.) to meet the design and/or performance criteria of a particular application. The process 400 then moves to the step 410.

In the step 410, the process 400 may receive proposals of objects generated with the input image based on the original feature map. In an example embodiment, a region proposal generator, which could be an external proposal method or an internal sub-network, may be used to generate a set of proposals/ROIs of objects within the input image. In general, the proposals/ROIs may be of non-uniform sizes. The process 400 then moves to the step 412.

In the step 412, the process 400 assigns each of the proposals/ROIs to a corresponding feature map in the feature map pyramid. In various embodiments, the assignment may be made based on predetermined criteria (e.g., to minimize an amount of re-sampling computation performed, etc.). In an example, the assignment may be made using the following pair of equations:

$$s_w = 2 \left\lfloor \log 2 \left( \frac{w}{f_w w_t} \right) \right\rfloor \text{ and} \quad (1)$$

$$s_h = 2 \left\lfloor \log 2 \left( \frac{h}{f_h h_t} \right) \right\rfloor,$$

where $s_w$ and w denote the downsizing factor along the width dimension and width of the ROI in the image space respectively, $f_w$ denotes the feature stride in the width dimension (e.g., 16 means the feature map is downsized 16× from the original image in the width dimension), $w_t$ denotes the target width of the per-ROI feature map (e.g. 7, etc.), $s_h$ and h denote the downsizing factor along the height dimension and height of the ROI in the image space respectively, $f_h$ denotes the feature stride in the height dimension (e.g., 16 means the feature map is downsized 16× from the original image in the height dimension), and $h_t$ denotes the target height of the per-ROI feature map (e.g. 7, etc.).

In an example, when both feature strides are 16 and the target size is 7×7, a 400×400 ROI may be assigned to a corresponding feature map of size C×H/2×W/2, and a C×7×7 pooling result may be generated (e.g., by cropping and resampling (resizing) the corresponding feature map (C×H/2×W/2) instead of the original feature map (C×H×W)).

In the step 414, the process 400 may generate pooling results for each object proposal using the corresponding feature map assigned in the step 412 instead of the original feature map. In an example embodiment, the process 400 may generate the pooling results by cropping and resampling (resizing) the corresponding feature map. In some embodiments, resampling may be performed by a warping tool. In an example, bilinear interpolation may be used as a warping tool to generate the per-ROI feature map of the target size. However, other warping tools (e.g., nearest neighbor interpolation, bicubic interpolation, etc.) may be used to generate the per-ROI features map of the target size.

In general, each ROI is first projected and scaled to the corresponding assigned feature map of the feature map pyramid. For example, the above-mentioned 400×400 ROI may result in a 12.5×12.5 region on the C×H/2×W/2 feature map after scaling it using the feature strides of 16 and a downsizing factor of 2. In an example, the mapped region may be programmed by software to bilinear interpolation hardware, which resizes features of the region and then the result may be passed as input to subsequent sub-networks on hardware. In a case when the ROI projects to a region smaller than the target size (e.g., 7×7) in the feature space, the original feature map may be used and bilinear interpolation applied to up-sample features of the region.

The process 400 then moves to the step 416, where the pooling results may be used for subsequent processing (e.g., as detected objects). In an example, each fixed-size feature map may be fed to a subsequent per-proposal sub-network (e.g. R-CNN) or process for object classification (e.g. car, pedestrian, or cyclist) and bounding box regression/refinement.

Figure 7:
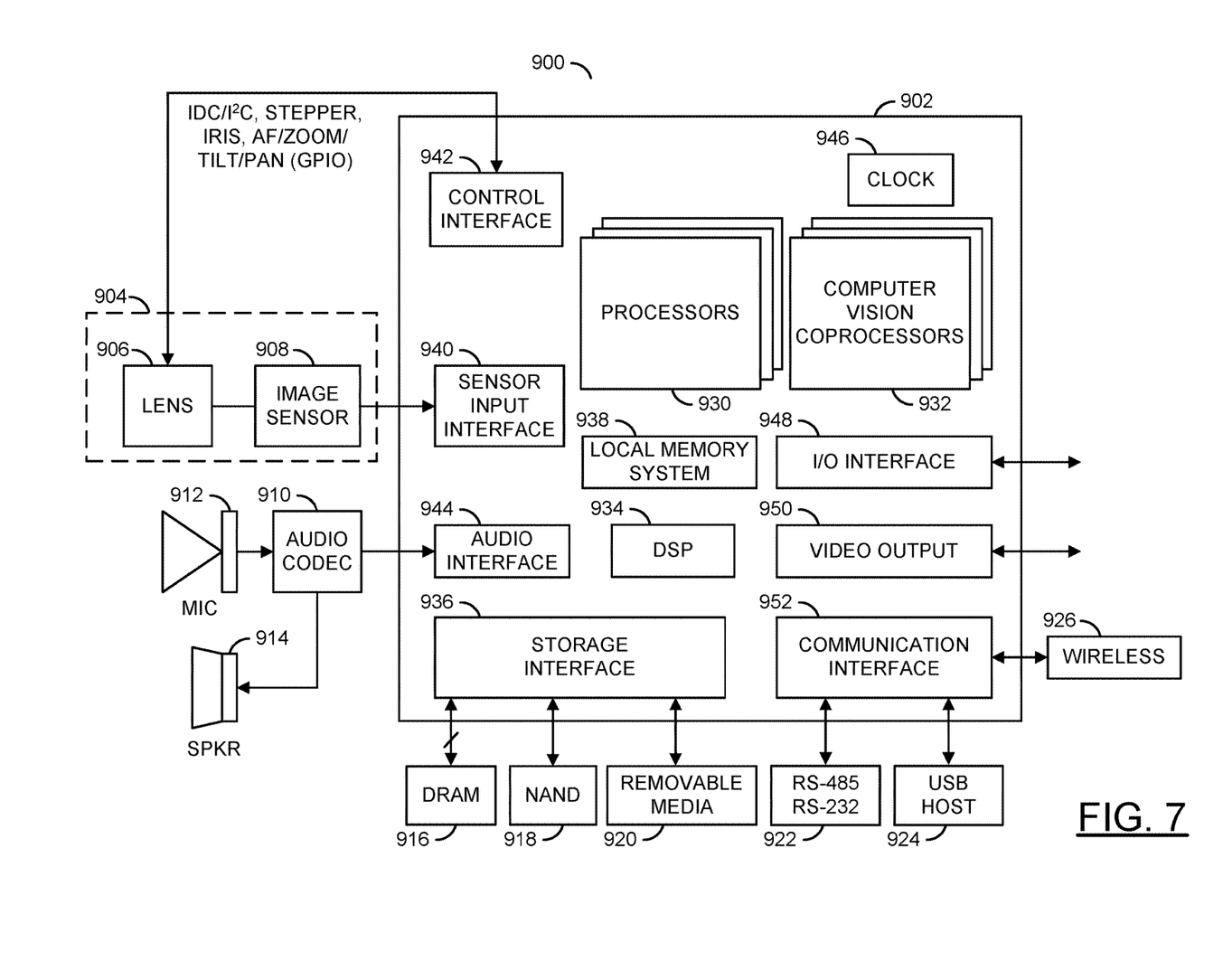
FIG. 7 is a diagram illustrating a camera system incorporating matching with approximate cross-check in accordance with an embodiment of the invention.

Referring to FIG. 7, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 6.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement a two-stage object detection engine in accordance with an example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit (I²C) interface, a serial peripheral interface (SPI), and a pulse width modulation (PWM) interface. The circuit 944 may implement an audio interface (e.g., an I²S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the coprocessors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-F, UART, etc.). In one example, the communication module 952 may implement a secure digital input output (SDIO) interface. The communication module 952 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, Zig-Bee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

A very efficient ROI pooling method is disclosed that achieves significant speed-ups over existing methods while maintaining comparable object detection performance. The ROI pooling method in accordance with embodiments of the invention may be used in both training and deployment phases of the object detector and supports any modern two-stage object detection networks. The ROI pooling method in accordance with embodiments of the invention is embedded device friendly and applicable to any modern two-stage object detection networks. The ROI pooling method in accordance with embodiments of the invention makes it possible to run modern CNN-based object detectors in real-time on resource-limited hardware for time-critical applications such as a self-driving vehicle. The new pooling scheme based on a feature map pyramid and ROI resampling, which may be built on top of a generic hardware engine configured, inter alia, to perform pooling and bilinear interpolation, make ROI pooling operations efficient in hardware.

The functions and structures illustrated in the diagrams of FIGS. 1 to 7 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store a feature map pyramid comprising an original feature map and a plurality of scaled feature maps;
   one or more hardware engines configured to perform pooling operations utilizing power of two down sampling; and
   a processor configured to generate said feature map pyramid from said original feature map using said one or more hardware engines.

2. The apparatus according to claim 1, wherein said one or more hardware engines are configured to perform one or more of (i) pooling of $2^n \times 2^n$ window-size with $2^n \times 2^n$ decimation, (ii) pooling of $2^m \times 2^n$ window size with $2^m \times 2^n$ decimation, (iii) pooling of $2^n \times 2^m$ window size with $2^n \times 2^m$ decimation, or (iv) any combination thereof, where n is an integer greater than or equal to 1 and m is an integer ranging from zero to n−1.

3. The apparatus according to claim 1, wherein said one or more hardware engines comprise generic engines configured to perform at least said pooling operations.

4. The apparatus according to claim 1, further comprising an object detector, wherein said processor is further configured to perform a region of interest pooling operation by assigning an object detection proposal generated by said object detector to a corresponding scaled feature map in said feature map pyramid to minimize an amount of re-sampling computation performed in generating a pooling result for said region of interest.

5. The apparatus according to claim 4, wherein said processor determines said corresponding scaled feature map in said feature map pyramid to which said object detection proposal is assigned based upon (i) a width dimension of the region of interest in an image space, (ii) a height dimension of the region of interest in said image space, (iii) a downsizing factor along said width dimension, (iv) a downsizing factor along said height dimension, (v) a feature stride in said width dimension, (vi) a feature stride in said height dimension, (vii) a target width, and (viii) a target height.

6. The apparatus according to claim 4, wherein said processor is further configured generate said pooling result for said region of interest by cropping and resampling said corresponding scaled feature map in said feature map pyramid to which said object detection proposal is assigned.

7. The apparatus according to claim 6, wherein said resampling comprises a warping operation.

8. The apparatus according to claim 6, wherein said processor configures bilinear interpolation hardware to resize features of the region of interest for use as an input to subsequent sub-networks on hardware.

9. The apparatus according to claim 4, wherein said object detector comprises a convolutional neural network based object detector.

10. The apparatus according to claim 1, wherein:
said feature map pyramid comprises said original feature map and 6 scaled feature maps;
said original feature map comprises a three-dimensional array having dimensions C×H×W; and
said six scaled feature maps comprise three-dimensional arrays having dimensions of (i) C×H/2×W, (ii) C×H×W/2, (iii) C×H/2×W/2, (iv) C×H/4×W/2, (v) C×H/2×W/4, and (vi) C×H/4×W/4.

11. The apparatus according to claim 1, wherein said apparatus is part of at least one of a computer vision system or an autonomous vehicle.

12. A method of performing region of interest pooling comprising:
storing an original feature map in a memory; and
generating a plurality of scaled versions of said original feature map using power of two down sampling to form a feature map pyramid comprising said original feature map and said plurality of scaled versions of said original feature map, wherein said region of interest pooling is performed using a corresponding feature map of said feature map pyramid to which a region of interest is assigned.

13. The method according to claim 12, wherein said plurality of scaled versions of said original feature map are generated using one or more hardware engines configured to perform pooling operations utilizing power of two down sampling.

14. The method according to claim 13, wherein said one or more hardware engines are configured to perform one or more of (i) pooling of $2^n \times 2^n$ window-size with $2^n \times 2^n$ decimation, (ii) pooling of $2^m \times 2^n$ window size with $2^m \times 2^n$ decimation, (iii) pooling of $2^n \times 2^m$ window size with $2^n \times 2^m$ decimation, or (iv) any combination thereof, where n is an integer greater than or equal to 1 and m is an integer ranging from zero to n−1.

15. The method according to claim 12, further comprising:
performing a region of interest pooling operation using a processor configured to minimize an amount of re-sampling computation performed in generating a pooling result for said region of interest by assigning an object detection proposal generated by an object detector to a corresponding feature map in said feature map pyramid.

16. The method according to claim 15, further comprising:
determining said corresponding feature map in said feature map pyramid to which said object detection proposal is assigned based upon (i) a width dimension of the region of interest in an image space, (ii) a height dimension of the region of interest in said image space, (iii) a downsizing factor along said width dimension, (iv) a downsizing factor along said height dimension, (v) a feature stride in said width dimension, (vi) a feature stride in said height dimension, (vii) a target width, and (viii) a target height.

17. The method according to claim 15, further comprising:
generating said pooling result for said region of interest by cropping and resampling said corresponding feature map in said feature map pyramid to which said object detection proposal is assigned.

18. The method according to claim 17, further comprising:
performing bilinear interpolation to resize features of the region of interest for use as an input to sub-networks on hardware.

19. The method according to claim 15, wherein said object detector comprises a convolutional neural network based object detector.

20. The method according to claim 15, further comprising:
utilizing a result of said region of interest pooling to classify objects in an environment around a vehicle; and
providing at least one of a warning to a driver of the vehicle or an adjustment to at least one of a drive train, a steering mechanism, or a braking system of said vehicle.

* * * * *